Jan. 3, 1961 A. BRUEDER 2,966,964
BRAKES FOR AUTOMOBILE VEHICLES
Filed May 28, 1956 4 Sheets-Sheet 2
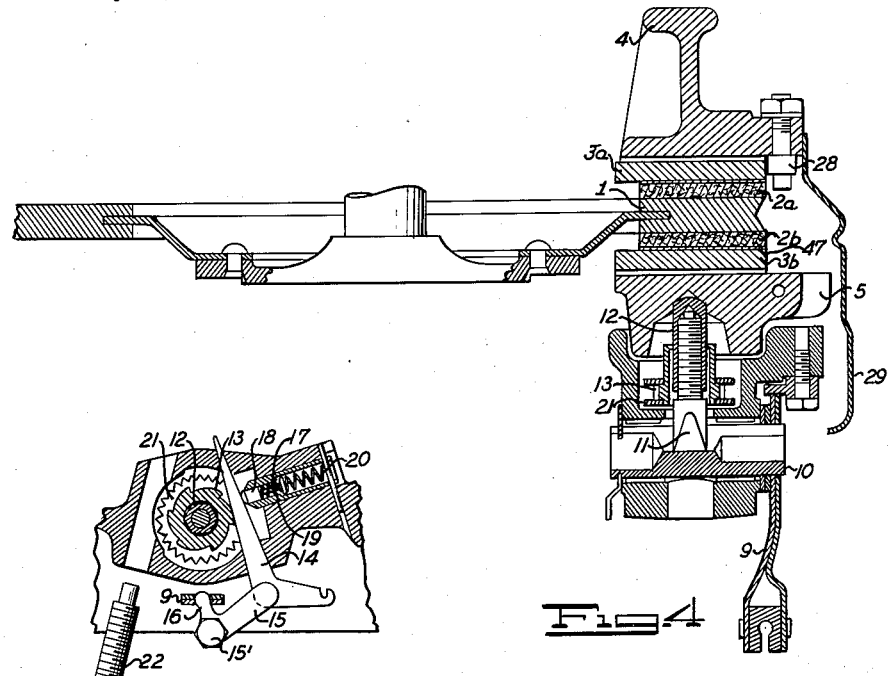
Fig.4
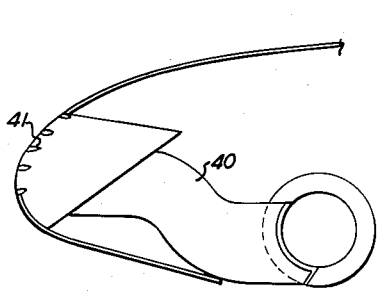
Fig.5
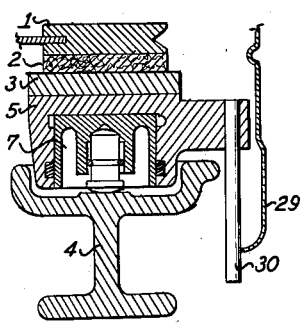
Fig.6
Fig.8
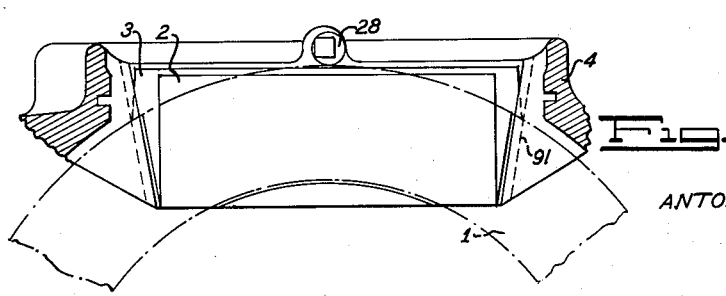
Fig.7
INVENTOR.
ANTOINE BRUEDER

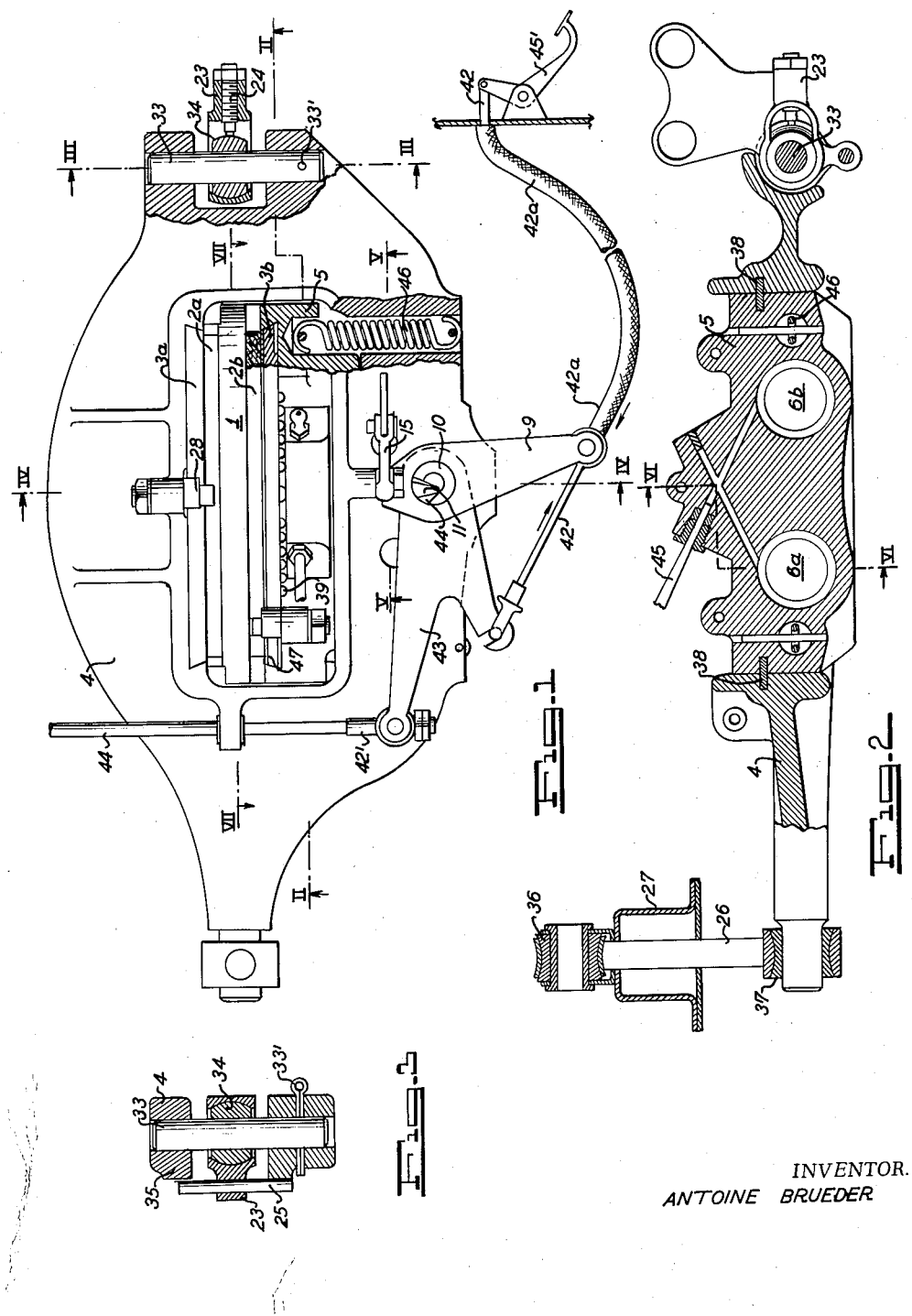

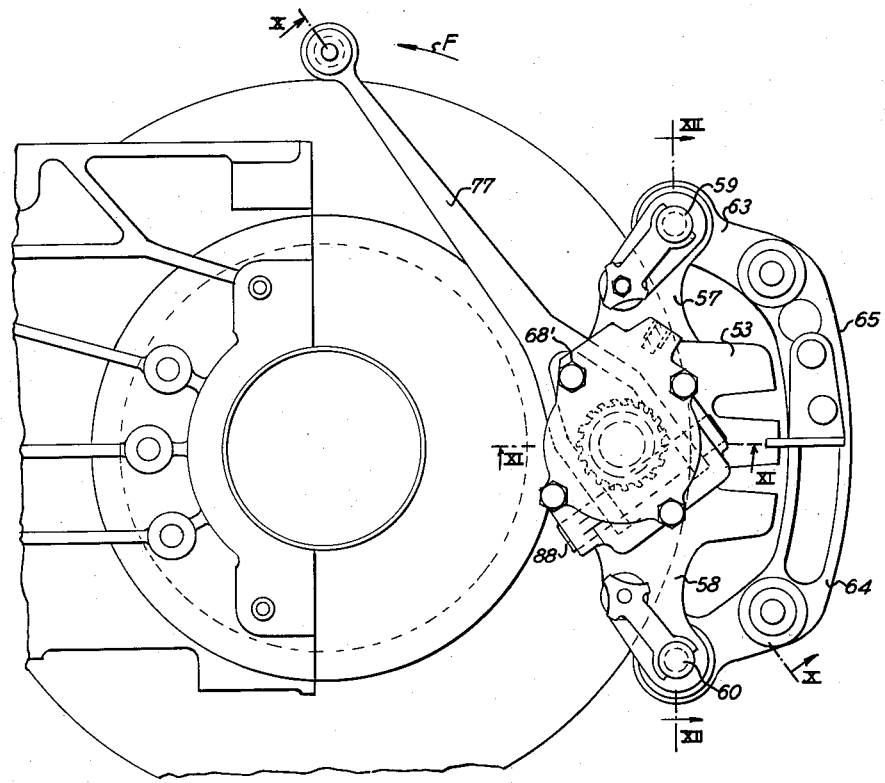
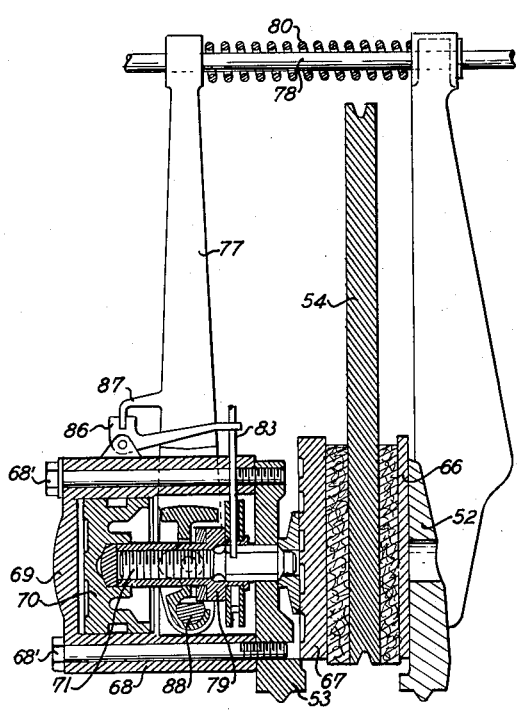
Fig.9
Fig.10
INVENTOR.
ANTOINE BRUEDER

Jan. 3, 1961 A. BRUEDER 2,966,964
BRAKES FOR AUTOMOBILE VEHICLES
Filed May 28, 1956 4 Sheets-Sheet 4
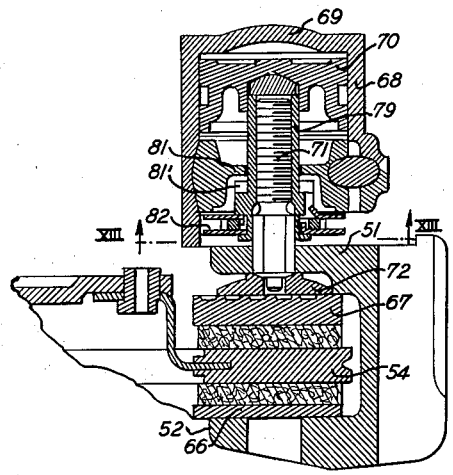
Fig.11
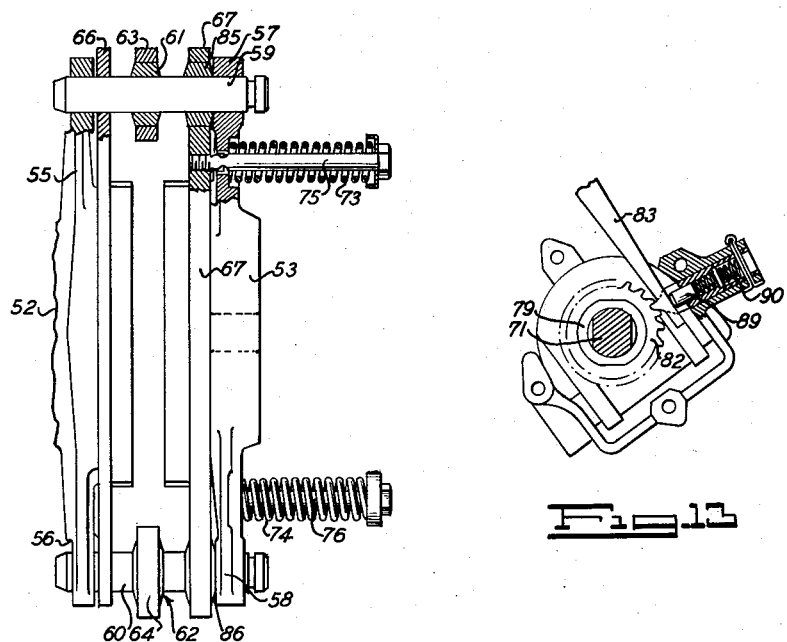
Fig.12
Fig.13
INVENTOR.
ANTOINE BRUEDER

United States Patent Office 2,966,964
Patented Jan. 3, 1961

2,966,964

BRAKES FOR AUTOMOBILE VEHICLES

Antoine Brueder, Paris, France, assignor to Societe Anonyme Andre Citroen, Paris, France, a French corporation Filed May 28, 1956, Ser. No. 587,900

Claims priority, application France May 26, 1955

4 Claims. (Cl. 188—73)

The invention relates to disc brakes and especially those intended for fitting on automobile vehicles, and has more particularly for its object improvements intended to give better operation and to facilitate maintenance.

More particularly, the invention relates to disc brakes of the type in which pistons, arranged in a movable support, act on a lining on one side of a disc coupled to the wheel in such manner that the support is displaced by reaction in the opposite direction and brings a second friction lining in contact with the opposite face of the disc.

The invention is more precisely directed to a form of suspension of the support of the friction linings and of the hydraulic cylinders, consisting in fixing the support at the rear by a knuckle-joint and at the front by an actuating crank-arm, so as to enable the support to work under tension and to be exactly adapted to the plate at the moment of braking. In accordance with a further feature of the invention, the friction linings are mounted on small plates which can move in slide-ways fitted by a dove-tail in the support, and which are held in position by means of eccentrics or similar members; this arrangement enables the linings to be easily and rapidly replaced through the cap of the support.

In accordance with a further form of embodiment, the brake support is of U-shape and is mounted astride the disc; it carries small plates, of which one is movable, on which the friction linings are mounted, and the whole unit is slidably mounted on horizontal spindles which are in turn supported by the intermediary of knuckle joints on a member which is rigidly fixed to the vehicle. With this arrangement, the braking unit is able to orientate itself freely by sliding on the spindles and pivoting about the knuckle-joints.

In addition, the operating members comprise only a single piston acting on the movable lining-carrier through the medium of a rod which also carries at its central portion the mechanical operating members and devices for taking up play, so that the piston is no longer subjected to the displacement due to the wear of the friction linings but only to the limited displacement due to the normal play; this enables the volume of the cylinder to be reduced to the minimum possible size, together with a reduced quantity of liquid employed, and in consequence the risks of overheating, of expansion and of vaporisation of the liquid are also minimised.

The invention is also directed to various arrangements which will be made clear in the description which follows below of forms of construction of brakes in accordance with the invention, reference being made to the accompanying drawings in which:

Fig. 1 is a plan view of a brake, with the upper movable cap removed and with certain parts broken away;

Fig. 2 is a vertical cross-section taken along the line II—II of Fig. 1;

Fig. 3 is a vertical cross-section taken along the line III—III of Fig. 1;

Fig. 4 is a vertical cross-section following the line IV—IV of Fig. 1;

Fig. 5 is a vertical cross-section following the line V—V of Fig. 1, with certain portions broken away;

Fig. 6 is a vertical cross-section along the line VI—VI of Fig. 2;

Fig. 7 is a vertical cross-section taken along the line VII—VII of Fig. 1;

Fig. 8 is a diagram showing the arrangement of a front brake inside the body of the vehicle;

Fig. 9 is a view in elevation of a further form of embodiment;

Fig. 10 is a cross-section taken along the line X—X of Fig. 9;

Fig. 11 is a cross-section along the line XI—XI of Fig. 9;

Fig. 12 is a cross-section taken along XII—XII of Fig. 9;

Fig. 13 is a cross-section showing details of the device for taking-up wear.

Referring to the drawings, in a first form of embodiment shown in Figs. 1 to 8, it is seen that on each side of the plate 1, constituted by a disc of cast-iron rigidly fixed to the shaft of the wheel to be braked, are arranged brake-linings 2a and b rigidly fixed to small plates 3a and b which are mounted in the support 4.

The support has a horizontally elongated form which leaves uncovered the greater part of the disc in order to permit of adequate cooling of the said disc; it is pierced at its central portion with an opening into which the disc passes, this opening being closed by a cover 29 which prevents the access of projections of oil or the entry of dust.

One of the small plates 3 is carried directly on the support 4 and the other is carried by a member 5 of substantial thickness and supported on slides 38; this member 5 moves laterially under the action of a liquid under pressure which is admitted into the cylindrical cavities 6a, 6b formed in this member and closed by pistons 7 which are carried on the support (see Fig. 6). The piston-carrying member 5 is supported against the disc 1 through the intermediary of its lining, and the piston moves the whole of the support unit by reaction and thus applies the other friction lining against the disc. This method of operation of disc brakes being well-known, it would not appear useful to describe it in further detail.

It is to be observed however, that the liquid under pressure which arrives through the conduit 45 is delivered through suitable branches into the cylinders 6a and 6b at the upper points of these latter, and this coupled with the fact that the liquid arrives at a high pressure, of the order of 100 kg. per sq. cm., enables the drainage cock which is normally provided to be dispensed with; in fact, the air contained in the pistons is discharged through the conduit 45 and from thence towards the reservoir at atmospheric pressure.

It will be noted that with this arrangement, it is necessary that the support should be capable of a slight lateral displacement so as to take up the play which normally exists between the disc and the friction linings, and also to compensate for the wear of the linings. On the other hand, by reason of the braking reaction which the support must withstand, it is necessary that this support should be able to oscillate in the vertical plane and thus damp the stress which is applied to it.

To this end, the invention provides a suspension in accordance with which the support 4 is retained at the rear by means of a shaft 33 which is fixed to the support by means of a split pin 33', this shaft passing into a knuckle-joint 34 which is in turn supported in a cage 23 rigidly fixed to the chassis of the vehicle. It is to be understood that the term "chassis" is used herein in its broadest sense and includes vehicle bodies and so forth. A screw 24 enables the gripping action of the shaft in the knuckle-joint to be regulated, the knuckle-joint being preferably of elastic material, and a pin 25 carried by the cage 23 limits the movements of the support, the latter being provided with a corresponding abutment member 35.

In an alternative form, the knuckle-joint 34 is split and is locked on the shaft 33 and in its housing by means of the screw 24 which receives an end portion so as to reduce the unit pressure on the knuckle-joint; the pin 33' is dispensed with, so that the support is free on the shaft 33. In this way, all errors of assembly are avoided, and this enables the inclination-limiting pin 25 to be dispensed with.

At its other extremity, the support is carried by a vertical crank-arm 26 (see Figs. 1 and 2) which is pivoted on the one hand to the support and on the other hand to the chassis 27 by the intermediary of elastic sleeves 26 and 37. In this way, the support can act in accordance with the forces to which it is subjected and can follow the wear of the friction-linings.

It will also be observed that this arrangement facilitates the mounting of the brake on the vehicle and does not require any strict precision of the position of the points of fixation on the chassis of the crank-arm 26 and the knuckle-joint 23.

The invention provides in addition a particularly convenient arrangement of the friction-linings. In fact, these linings are mounted on small plates which slide in dovetail slide-ways 91 (see Fig. 7), one in the support and the other in the movable piston-carrier member 5, and which are retained in position by means of eccentrics 28. When the friction-linings are worn, which can readily be checked by means of a stud 30 (see Fig. 6) rigidly fixed to the moving jaw and one extremity of which projects beyond the exterior of the support, it is only necessary to withdraw the cover 29, the eccentrics 28, and then the plates 3 which slide easily in their grooves, in order to renew the linings by replacing the worn plates by plates fitted with new linings.

It will also be noted that the member 5 is of substantial thickness, on the one hand in order to provide a sufficient rigidity for the distribution of the pressures and, on the other hand, in order to slide easily and without possibility of jamming inside the support 4; in order to ensure a better cooling, the member 5 is provided with vertical milled slots, for example of semi-circular form such as shown at 39, which provide an air passage permitting of the evacuation of the heat produced in the lining through the intermediary of the small plate and considerably reducing the heating of the member 5 and in consequence that of the liquid which is supplied to the cylinders which are formed in this member. In order to limit also the exchange of heat between the friction-lining 2 and the small plate 3, which are carried on the member 5, a small insulating plate 47 is provided between these parts.

In the drawings, the member 5 has been shown as subjected to the action of a restoring spring 46; this spring may be necessary in order to ensure the return of the operating members to their initial position; it should be understood however that this spring plays no part in the operation of the brake proper and that it could be eliminated without effecting the satisfactory working of the device.

In order that the normal clearance between the disc and the friction linings does not increase with the wear of these linings, there is provided, in the usual manner, a mechanism of the semi-automatic type for taking-up play, this mechanism being actuated by the operation of the safety control which is effected by the foot. This safety control acts on the lever 9, actuating a cam-shaft 10 which pushes a threaded spindle 11 which engages in a screw 12, the screw being of the hexagon type which slidably receives a ratchet wheel 13. This ratchet wheel is operated by a crank-arm 14 through the intermediary of a rocker arm 15 pivoted at 15', the knuckle-joint 16 of which follows the lever 9 (see Fig. 5).

When, by reason of wear of the friction linings 2, the lever 9 carries out too great a travel, it draws the crank-arm 14 towards the outside by an amount such that this arm engages the preceding tooth of the ratchet wheel 13 at the end of its travel; on the return travel, under the action of the restoring springs, the ratchet 13 then causes the nut 12 to rotate, thus lengthening the assembly 12 and 11, which takes up the wear.

This operation takes place every time the safety brake is operated. A push-rod 17 containing a dolly 18 actuated by springs 19 and 20 is provided with the object of:

(1) Maintaining contact between the ratchet 13 and the crank-arm 14.

(2) Preventing all movement of the ratchet during the rearward movement of the crank-arm 14.

The ratchet comprises two cheeks of which one, 21, is cut in the form of teeth, which enables the whole system to be brought back by means of the movable screw 22.

The brake is also provided, as has already been stated, with a safety control actuated by a pedal 45. This control acts through a cable 42 mounted in a flexible sheath 42a of the Bowden type, this being in abutment against the lever 9 in which the axis 10 is a driving fit.

The sheath 42a being thus supported by the lever 9 and the shaft 10 which it causes to rotate on the brake lining of the same side, the force transmitted by the pedal to the cable 42 applies a tractive force to this cable so as to actuate the brake on the opposite side, through the intermediary of the lever 43 which is freely mounted on the shaft 10, and of the reversing cable 42', which is also mounted in a sheath 44, the extremities of which are respectively supported by each support member 4 in the manner shown.

Finally, in order to permit of an active cooling of the brake, whilst at the same time protecting it from projections of mud or oil, the brake is arranged in a space inside the vehicle body, and is placed on the circuit of an air conduit 40 which receives the air derived from the dynamic pressure created by the forward movement of the vehicle in an air supply chamber 41, the air being then evacuated towards the rear and underneath the body. An arrangement of this kind, which is suitable for the front-wheel brakes, has been shown in Fig. 8.

In a second form of embodiment, the brake is constituted by a support 51 in the form of a U, the limbs of which 52 and 53 surround the faces of the disc 54 which is rigidly fixed to the axle of the wheel of the vehicle and are provided with vertical extensions 55, 56 and 57, 58.

The extremities of these extensions carry two by two horizontal spindles 59, 60 carried by knuckle-joints 61, 62 which are themselves mounted at the extremities 63, 64 of a forked member 65 rigidly fixed to the chassis of the body or other part of the vehicle. These spindles also receive the lining-carrier plate 67 which is slidably-mounted, whilst the other lining 66 is mounted on the limb 52 of the support.

On the side 53 of the support is mounted, towards the exterior, a cylinder 68 which is fixed on the support in any suitable manner, for example by means of screws 68', and the base of which is closed by a wall 69; the cylinder communicates with the incoming and outgoing piping systems for fluid under pressure, and contains a piston 70 which acts by means of the rod 71 and the push-rod 72 on the movable lining-carrier plate 67. Springs 73 and 74 carried on the face 53 are provided to bring back the plate to its normal position, spaced away from the disc, through the intermediary of thrust rods 75 and 76.

The extremities of the rod 71 are supported, one by the intermediary of a threaded socket 79 against the piston 70 by a sliding engagement, and the other against the push-rod 72. These supports are effected by spherical contact against the piston and the push-rod, this arrangement permitting of a slight de-centering of the unit and prevents all possibility of jamming of the piston in the cylinder. The rod receives at its central portion the auxiliary mechanical control members actuated by a lever 77. The head of this lever is operated by a system of rods 78 against the action of a restoring spring 80; at its base, the lever acts on the rod 71 and is supported by two contact members 81 on a flange 81' formed at the base of the socket 79 screwed to the extremity of the rod 71.

On this socket also acts the device for taking up play, which is constituted essentially by a ratchet wheel 82 rigidly fixed to the socket 79 and by a pawl 83 actuated by a cranked lever 86, this latter being rotatably driven by a finger 87 rigidly fixed to the lever 77. Pawl 83 is held against ratchet wheel 82 by a plunger 89 loaded by a spring 90 (Fig. 13).

The operation of this device will be readily understood: the fluid sent into the bottom of the cylinder 68 pushes back the piston 70 which produces, through the rod 71, the gripping action of the friction lining carried by the small plate 67, and then by reaction the displacement in the opposite direction, of the support and the application of the friction lining carried by the small plate 66. It will be noted that this movement of the brake support is easily carried out by virtue of the spindles 59, 60, on which the plate 67 is slidably mounted and which are themselves slidably received in the arms of the fork 63 and 64. In addition, the sliding movement is completed by a possibility of pivotal movement by reason of the knuckle-joints 61, 85, 62 and 86 provided between the spindles on the one hand and the fork arms 63, 64 and the small plate 67 on the other hand.

In this manner, the brake support which is coupled to a part suspended from the vehicle may slide and freely orientate itself so as to follow the slight possible displacements of the disc, which is mounted on the transmission shaft communicating the movement to the wheel.

It will also be observed that since the rotation of the disc takes place in the direction of the arrow F (Fig. 9), the unit works in tension on the lower spindle, which avoids all torsional effects on the support members.

As indicated above, the brake may also be operated mechanically by means of the rod system 78 and the lever 77; the latter lever acts by moving laterally on the rod 71 in the sense adapted for the application of the brake (see Fig. 2); the spring 80 ensures the return of the rod system to its normal position.

This movement also involves the displacement of the device for taking up play, which acts on the socket 79 in such manner as to unscrew the rod 71 when this is necessary, and in consequence to push back this rod and the plate 67 towards the disc; this takes place when the wear of the section lining results in a displacement of the pawl 83 when the lever 77 is gripped, causing the pawl to advance by one step on the ratchet wheel 82 which is fixed to the socket 79.

It will also be noted that the arrangement between the piston 70 and the lining-carrier plate 53, of a rod which carries the mechanism for taking up play and the mechanical control lever, enables the stroke of the piston to be limited to the clearance provided for the friction linings, while this stroke is never influenced by the wear of the said linings, so that it is possible to give the cylinder the smallest possible volume and thus the smallest possible quantity of liquid in this cylinder, thereby avoiding all possibility of overheating and vaporisation. At the same time, this arrangement permits of an advantageous distance being provided between the cylinder and the parts which are liable to become heated during the operation of the brake.

I claim:
1. A disc brake for a wheel of a vehicle provided with a chassis, comprising: a first friction member, a movable element supporting said friction member, a movable support supporting the movable element; a brake disc having opposite faces and rigidly fixed to the wheel; hydraulic means for applying said first friction member against one face of said disc; a second friction member mounted on said movable support, the said second friction member being applied against the other face of said disc by the reaction of the said support; and means for mounting the said movable support on the chassis to permit a limited lateral movement and a pivotal movement of said support, whereby the support is able to follow displacements in any direction of the said brake disc, said means comprising a knuckle-joint and an articulated crank-arm at opposite extremities of said support and coupling the latter to said chassis.

2. A disc brake for a wheel of a vehicle provided with a chassis, comprising: a first friction member, a movable element supporting said friction member, a movable support supporting the movable element; a brake disc having opposite faces and rigidly fixed to the wheel; hydraulic means for applying said first friction member against one face of said disc; a second friction member mounted on said movable support, the said second friction member being applied against the other face of said disc by the reaction of the said support; and means for mounting the said movable support on the chassis to permit a limited lateral movement and a pivotal movement of said support, whereby the support is able to follow displacements in any direction of the said brake disc, said disc-brake further comprising carrier plates coupling the friction members to said support, an eccentric bolt engaging said plates, and dove-tail slides on the carrier plates and movable support, said plates being positioned in the said movable support by means of said dove-tail slides, said eccentric bolt holding the carrier plates in position.

3. A disc brake for a wheel of a vehicle having a chassis, comprising: a first friction member, a movable element supporting said member, a movable support supporting said element; a brake disc having opposite faces rigidly fixed to the wheel; hydraulic means for applying said first friction member against one face of said disc; a second friction member mounted directly on said movable support, the second friction member being applied against the other face of said disc by the reaction of said support; an auxiliary operating device mounted on said movable support; said movable element being constituted by a piston-carrier block slidably supported in said movable support and movable in response to said hydraulic means; and means for mounting the said movable support on the chassis for limited lateral movement and a pivotal movement of said support whereby the support is able to follow displacements in any direction of the said brake disc.

4. A disc brake as claimed in claim 3, and further comprising a safety control coupled to the said piston-carrier block to adjust the friction members towards said disc.

References Cited in the file of this patent
UNITED STATES PATENTS

| | | |
|---|---|---|
| 164,891 | Wieterhold et al. | June 22, 1875 |
| 1,527,798 | Hawley | Feb. 24, 1925 |
| 1,571,243 | Down | Feb. 2, 1926 |
| 1,959,049 | Buus | May 15, 1934 |
| 2,001,599 | Cohen | May 14, 1935 |
| 2,466,917 | Stewart | Apr. 12, 1949 |
| 2,597,603 | Tack | May 20, 1952 |
| 2,689,024 | Trevaskis | Sept. 14, 1954 |
| 2,756,844 | Chamberlain et al. | July 31, 1956 |
| 2,784,811 | Butler | Mar. 12, 1957 |

FOREIGN PATENTS

| | | |
|---|---|---|
| 158,520 | Australia | Aug. 27, 1954 |
| 717,350 | Great Britain | Oct. 27, 1954 |
| 718,231 | Great Britain | Nov. 10, 1954 |